(12) United States Patent
Ruutu et al.

(10) Patent No.: US 9,918,237 B2
(45) Date of Patent: Mar. 13, 2018

(54) TRANSMITTING POSITIONING PACKETS

(75) Inventors: Jussi Ruutu, Espoo (FI); Markku Anttoni Oksanen, Helsinki (FI); Ville Valtteri Ranki, Jorvas (FI); Antti Paavo Tapani Kainulainen, Nummela (FI); Fabio Belloni, Espoo (FI)

(73) Assignee: Provenance Asset Group LLC, Essex, CT (US)

( * ) Notice: Subject to any disclaimer, the term of this patent is extended or adjusted under 35 U.S.C. 154(b) by 636 days.

(21) Appl. No.: 14/240,478

(22) PCT Filed: Sep. 5, 2011

(86) PCT No.: PCT/IB2011/053880
§ 371 (c)(1),
(2), (4) Date: Feb. 24, 2014

(87) PCT Pub. No.: WO2013/034952
PCT Pub. Date: Mar. 14, 2013

(65) Prior Publication Data
US 2014/0206411 A1 Jul. 24, 2014

(51) Int. Cl.
*G02B 27/00* (2006.01)
*H04W 24/00* (2009.01)
*H04W 64/00* (2009.01)
*H04W 52/28* (2009.01)
*G01S 5/02* (2010.01)
*H04B 17/27* (2015.01)

(52) U.S. Cl.
CPC ............. *H04W 24/00* (2013.01); *G01S 5/021* (2013.01); *H04B 17/27* (2015.01); *H04W 52/283* (2013.01); *H04W 52/286* (2013.01); *H04W 64/00* (2013.01)

(58) Field of Classification Search
USPC ......... 455/522, 126, 186.1, 101, 67.7, 456.1
See application file for complete search history.

(56) References Cited

U.S. PATENT DOCUMENTS

| 5,119,104 A | 6/1992 | Heller |
| 6,404,388 B1 | 6/2002 | Sollenberger et al. |
| 2003/0045250 A1* | 3/2003 | Haapoja ................ H04W 52/52 455/126 |

(Continued)

FOREIGN PATENT DOCUMENTS

| DE | 10035040 A1 * | 2/2002 | ........... G02B 26/101 |
| WO | 2013/005081 A1 | 1/2013 | |

OTHER PUBLICATIONS

Fan Chao and Siyuan He, Development of a Micromirror Based Laser Vector Scanning Automotive HUD, Aug. 7, 2011, Proceedings of the 2011 !EEE, International Conference on Mechatronics and Automation.*

(Continued)

*Primary Examiner* — Ganiyu A Hanidu
(74) *Attorney, Agent, or Firm* — Dinsmore & Shohl LLP

(57) ABSTRACT

Apparatus comprises means for monitoring at least one criterion for an adjustment of a transmit power of a positioning packet by a mobile apparatus, the positioning packet enabling a determination of a position of the mobile apparatus to be made; and means for, when it is detected that the at least one criterion is met, causing an adjustment of the transmit power of positioning packets at the mobile apparatus.

22 Claims, 3 Drawing Sheets

(56) References Cited

U.S. PATENT DOCUMENTS

| | | | |
|---|---|---|---|
| 2004/0137915 A1* | 7/2004 | Diener | H04L 41/0896 455/456.1 |
| 2005/0227625 A1* | 10/2005 | Diener | H04B 17/23 455/67.7 |
| 2006/0012480 A1 | 1/2006 | Klowak | |
| 2006/0092016 A1 | 5/2006 | Modes et al. | |
| 2007/0087773 A1 | 4/2007 | Yoon et al. | |
| 2008/0042901 A1* | 2/2008 | Smith | G01S 5/021 342/464 |
| 2008/0052394 A1* | 2/2008 | Bugenhagen | H04L 12/14 709/224 |
| 2008/0220803 A1* | 9/2008 | Lee | H04W 52/245 455/522 |
| 2009/0088089 A1* | 4/2009 | Chandra | H04B 7/02 455/101 |
| 2009/0088108 A1* | 4/2009 | Granlund | H04W 48/18 455/186.1 |
| 2010/0109849 A1* | 5/2010 | Wang | G01S 5/18 340/10.5 |
| 2010/0118844 A1* | 5/2010 | Jiao | H04W 24/02 370/338 |
| 2013/0331120 A1* | 12/2013 | Ranki | G01S 3/14 455/456.1 |
| 2014/0045917 A1* | 2/2014 | Nakashiro | A61K 31/7088 514/44 A |

OTHER PUBLICATIONS

Extended European Search Report received for corresponding European Patent Application No. 11871979.8, dated Mar. 12, 2015, 6 pages.

International Search Report and Written Opinion received for corresponding Patent Cooperation Treaty Application No. PCT/IB2011/053880, dated Jun. 27, 2012, 12 pages.

\* cited by examiner

TRANSMITTING POSITIONING PACKETS

RELATED APPLICATION

This application was originally filed as Patent Cooperation Treaty Application No. PCT/IB2011/053880 filed Sep. 5, 2011.

FIELD

The invention relates to positioning.

BACKGROUND

There are a number of known techniques for determining the position of an apparatus using radio frequency signals. Some popular techniques relate to use of the Global Positioning System (GPS), in which multiple satellites orbiting Earth transmit radio frequency signals that enable a GPS receiver to determine its position. However, GPS is often not very effective in determining an accurate position indoors.

Some non-GPS positioning techniques enable an apparatus to determine its position indoors. However, many of these techniques do not result in an accurate position being determined, and others suffer from other disadvantages.

SUMMARY

A first aspect of the invention provides a method comprising:
monitoring at least one criterion for an adjustment of a transmit power of a positioning packet by a mobile apparatus, the positioning packet enabling a determination of a position of the mobile apparatus to be made; and
when it is detected that the at least one criterion is met, causing an adjustment of the transmit power of positioning packets at the mobile apparatus.

The monitoring may be performed at least by the mobile apparatus.

The at least one criterion may relate to receipt, by the mobile apparatus, of a reconfiguration message from a stationary apparatus.

The mobile apparatus may monitor the at least one criterion in predetermined time intervals. The predetermined time intervals may be predetermined periods following each positioning packet transmission.

The monitoring may be performed at least at a stationary apparatus, and causing an adjustment of the transmit power may comprise causing, by the stationary apparatus, a transmission of a configuration message to the mobile apparatus. The method may comprise the mobile apparatus starting a timer in response to receiving a reconfiguration message and increasing a transmit power upon expiry of the timer.

The criterion monitored by the stationary apparatus may relate to at least one of:
a position of the mobile apparatus;
a dynamic status of the mobile apparatus;
a current time of day;
information received, at the stationary apparatus, from the mobile apparatus;
a current battery status of the mobile apparatus; and
a quality of transmissions received from the mobile apparatus.

The criterion monitored by the stationary apparatus may relate to at least one of:
time of day;
a load placed on processing resources of the stationary apparatus;
utilization of data transmission resources; and
a number of mobile apparatuses from which positioning packets are received.

The re-configuration message may indicate at least one of:
a transmit power for the mobile apparatus;
a range of transmit powers for the mobile apparatus;
a change in a transmit power currently used by the mobile apparatus;
rules or policies for adjusting the transmit power at the mobile apparatus.

The method may comprise transmitting, by the mobile apparatus, one or more of:
a confirmation of adjustment of transmit power;
a report of failure of an adjustment of transmit power;
an indication of an adjusted transmit power;
an energy status of a battery of the mobile apparatus;
supported transmit power levels;
an indication of a dynamic state of the mobile apparatus; and
an indication of a mode of operation of the mobile apparatus.

The mobile apparatus may be a tag.

The mobile apparatus may be a portable communications device such as a mobile phone, smart phone, tablet computer or laptop computer.

The method may comprise transmitting a Bluetooth low energy positioning packet.

A second aspect of the invention provides a computer program comprising machine readable instructions that when executed by computing apparatus cause it to perform the method of any preceding claim.

A third aspect of the invention provides apparatus comprising:
means for monitoring at least one criterion for an adjustment of a transmit power of a positioning packet by a mobile apparatus, the positioning packet enabling a determination of a position of the mobile apparatus to be made; and
means for, when it is detected that the at least one criterion is met, causing an adjustment of the transmit power of positioning packets at the mobile apparatus.

The means for monitoring may be provided at least by the mobile apparatus.

The at least one criterion may relate to receipt, by the mobile apparatus, of a re-configuration message from a stationary apparatus.

The mobile apparatus may include means for monitoring the at least one criterion in predetermined time intervals.

The predetermined time intervals may be predetermined periods following each positioning packet transmission.

The means for monitoring may be provided at least at a stationary apparatus, and the means for causing an adjustment of the transmit power may comprise means for causing, by the stationary apparatus, a transmission of a configuration message to the mobile apparatus.

The mobile apparatus may comprise means for starting a timer in response to receiving a reconfiguration message and means for increasing a transmit power upon expiry of the timer.

The criterion monitored by the stationary apparatus may relate to at least one of:
a position of the mobile apparatus;
a dynamic status of the mobile apparatus;
a current time of day;

information received, at the stationary apparatus, from the
mobile apparatus;
a current battery status of the mobile apparatus; and
a quality of transmissions received from the mobile
apparatus.
The criterion monitored by the stationary apparatus may
relate to at least one of:
time of day;
a load placed on processing resources of the stationary
apparatus;
utilization of data transmission resources; and
a number of mobile apparatuses from which positioning
packets are received.
The re-configuration message may indicate at least one of:
a transmit power for the mobile apparatus;
a range of transmit powers for the mobile apparatus;
a change in a transmit power currently used by the mobile
apparatus;
rules or policies for adjusting the transmit power at the
mobile apparatus.
The apparatus may comprise means for transmitting, by
the mobile apparatus, one or more of:
a confirmation of adjustment of transmit power;
a report of failure of an adjustment of transmit power;
an indication of an adjusted transmit power;
an energy status of a battery of the mobile apparatus;
supported transmit power levels;
an indication of a dynamic state of the mobile apparatus;
and
an indication of a mode of operation of the mobile
apparatus.
The mobile apparatus may be a tag.
The mobile apparatus may be a portable communications
device such as a mobile phone, smart phone, tablet computer
or laptop computer.
The apparatus may comprise means for transmitting a
Bluetooth low energy positioning packet.

A fourth aspect of the invention provides apparatus comprising at least one processor and at least one memory including computer program code, the at least one memory and the computer program code configured to, with the at least one processor, cause the apparatus at least to perform:
monitoring at least one criterion for an adjustment of a transmit power of a positioning packet by a mobile apparatus, the positioning packet enabling a determination of a position of the mobile apparatus to be made; and
when it is detected that the at least one criterion is met, causing an adjustment of the transmit power of positioning packets at the mobile apparatus.

A fifth aspect of the invention provides a computer readable medium having stored thereon machine readable instructions that when executed by computing apparatus control it to perform a method comprising:
monitoring at least one criterion for an adjustment of a transmit power of a positioning packet by a mobile apparatus, the positioning packet enabling a determination of a position of the mobile apparatus to be made; and
when it is detected that the at least one criterion is met, causing an adjustment of the transmit power of positioning packets at the mobile apparatus.

It is to be understood that the presentation of the invention in this section is merely exemplary.

Other exemplary features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EMBODIMENTS

Figure 1:
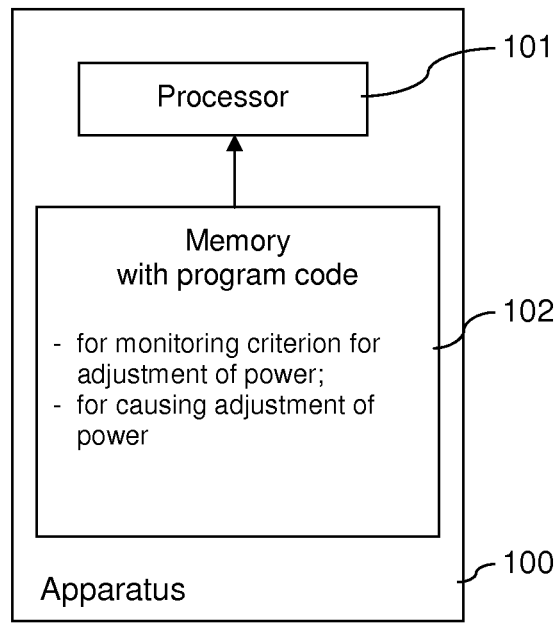
FIG. 1 is a schematic block diagram of apparatus according to various embodiments and aspects of the invention.

Positioning packets of a mobile apparatus can be used to determine and track the position of a mobile apparatus in any area provided with a suitable infrastructure. The mobile apparatus may be for instance a location tag that is to be used for asset tracking. It may alternatively be a more complex device.

Positioning making use of positioning packets can be used for instance for achieving accurate positioning indoors; it may enable a resolution of down to 30 cm. It may be based for instance on low cost Bluetooth Low Energy (BT LE) technology, which is a feature of the Bluetooth 4.0 technology being standardized by the Bluetooth Special Interest Group (SIG).

A positioning system making use of periodic BT LE transmissions can be used with smart devices that locate themselves using a BT LE signal emitted by directional transceivers (DT). The DTs are also referred to as beacons.

Alternatively, a reversed mode of operation can be used. In this "asset tracking" mode, BT LE transceivers that are referred to as tags or location tags emit a signal that is picked up by DTs. The signal is a data packet that enables a DT to identify the tag. The packet may be referred to as a positioning packet. The positioning packet has a form that allows the DT (or another device) to calculate the direction vector (bearing) from the DT towards the tag using a reception of the signal by multiple antennas of the DT. This process is also referred to as "tag update". An HDP (high definition positioning) infrastructure behind the DTs may calculate the position of the tag. Position may be calculated on the known location and orientation of one DT and a bearing to the tag from the DT, optionally with constraint information. Position may be calculated based on the bearings determined by two, three or more DTs using triangulation. The HDP infrastructure may comprise to this end a positioning server that contains data buffering and position calculation functions. Additionally, the HDP infrastructure may contain various management and application servers.

Location tags supporting the second operating mode can be particularly small and inexpensive, and they may be attached to any desired moving object. A location tag may comprise for instance a battery, some logic in the form of a microcontroller and radio parts. It may be configured to periodically transmit a signal in order to enable determination of positions of the tag. The positions may be used, for instance, for tracking an object to which the tag is associated. Typical frequencies of transmissions and thus of enabled location updates are 1, 10 or 50 times per second.

While a positioning of a mobile apparatus by means of positioning packets of the mobile apparatus can be realized in a positioning system using BT LE, it is to be understood that a similar approach can be used with various other systems and transmission technologies, for instance with a positioning system using active radio frequency identification (RFID).

It is to be understood that any feature presented for a particular exemplary embodiment may also be used in combination with any other described exemplary embodiment of any category.

Location tags and similar apparatuses that are used for asset tracking are typically attached to some object for a long period of time. For asset tracking, it is beneficial if the batteries powering the tags last a long time, preferably for years. The tags may be arranged in a place that does not allow easy replacement of the battery. Moreover, a replacement may involve a significant amount of manual work that may not be worthwhile with low cost tags. The tags may also be disposable and not allow battery replacement.

The main source of energy consumption at a tag results from the transmission of positioning packets by the tag for location updates. In between the transmissions, the energy consumption may be minimal, since the tag effectively sleeps, although it may also listen for packets transmitted for instance by a DT. Thus, the frequency of transmission of positioning packets is an important factor in the battery life of the tag.

The transmission of a positioning packet by a tag has an effect on other aspects of the system. For instance, the transmission of the positioning packets may interfere with positioning packets that are being transmitted by other tags elsewhere in the system. If there is any overlap in the transmissions of the two positioning packets and a DT is able to receive from both of the tags, correct decoding of the information in the positioning packets and/or identification of an accurate bearing to the tags may be prevented.

The transmissions by tags of positioning packets also has an effect on the processing needed by the infrastructure. The more positioning packets are received by DTs, the more processing is needed. Of course, a single positioning packet transmission will often be received by a number of DTs, and each received copy of the positioning packet will typically be processed. Typically, bearings from only a small number of DTs, for instance one, two or three DTs, is needed in order to obtain a high quality position estimate.

Even if the infrastructure is provided with the ability to disregard copies of positioning packets that are received from DTs relatively remote from a tag, data transmission capacity is required in order to relay signals from the DTs to the infrastructure.

Additionally, if the system is deployed in a building with several floors and open spaces between floors (e.g. in a shopping mall with several floors and an open space escalator in between) there is the possibility that DTs on different floors will receive a positioning packet transmitted by a tag. This increases the complexity of position calculations because it requires determination of the floor of the building on which the tag is located.

FIG. 1 is a schematic block diagram of an exemplary embodiment of an apparatus according to the invention.

Apparatus 100 comprises a processor 101 and, linked to processor 101, a memory 102. Memory 102 stores computer program code, which is designed for monitoring at least one criterion and for causing an adjustment of a transmit power of a periodical transmission if the at least one criterion is met. Processor 101 is configured to execute computer program code stored in memory 102 in order to cause a device to perform desired actions.

An operation of apparatus 100 will now be described with reference to the flow chart of FIG. 2. The operation is an exemplary embodiment of a method according to the invention. Processor 101 and the program code stored in memory 102 cause a device to perform the operation when the program code is retrieved from memory 102 and executed by processor 101.

The device monitors at least one criterion for adjusting a power of a positioning packet of information by a mobile apparatus via an air interface (action 201). The transmission enables a determination of a position of the mobile apparatus.

Whenever it is detected that the at least one criterion is met (action 202), the device causes an adjustment of the transmit power (action 203).

Figure 2:
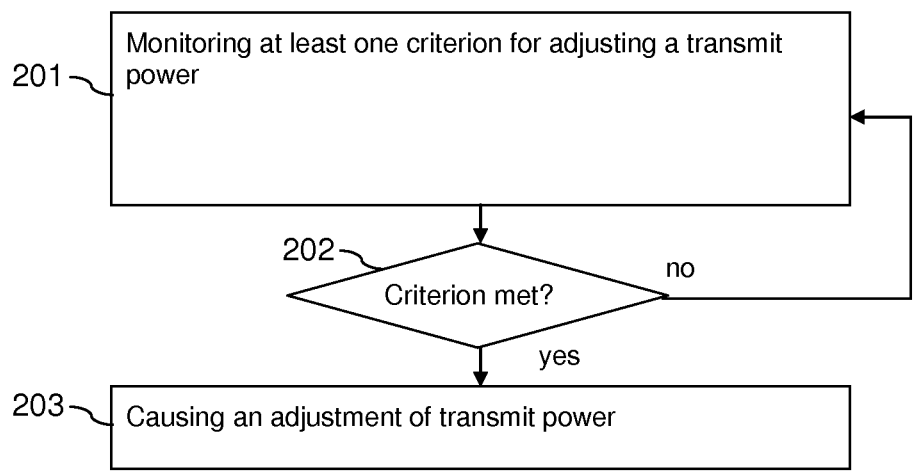
FIG. 2 is a flow chart illustrating an exemplary operation of the FIG. 1 apparatus.

The operation presented in FIG. 2 thus supports a positioning of a mobile apparatus that is based on positioning packets of the mobile apparatus. It enables an adjustment of transmit power based on monitored criteria. This may have the effect that the positioning packet is transmitted at a suitable power level for a current situation as represented by the monitored criteria.

The information may comprise information identifying the mobile apparatus.

Apparatus 100 illustrated in FIG. 1 and the operation illustrated in FIG. 2 may be implemented and refined in various ways.

The apparatus of FIG. 1 may correspond to the mobile apparatus or be a stationary apparatus, and the actions of the method of FIG. 2 may be performed at the mobile apparatus and/or at a stationary apparatus. In the respective latter case, causing an adjustment of the transmit power may comprise causing, by the stationary apparatus, a transmission of a re-configuration message to the mobile apparatus.

If the actions of the method of FIG. 2 are performed at the mobile apparatus, this may have the advantage that information that is only available at the mobile apparatus can be taken into account without requiring a corresponding transmission of the information to a stationary apparatus. If the actions are performed at the mobile apparatus only, this may have the advantage that additional energy for listening to re-configuration messages on the air interface is not needed. It may further have the advantage that it is suitable for a mobile apparatus supporting transmissions only. In this case, the apparatus does not necessarily have to comprise a receiver.

If the actions are performed at a stationary apparatus such as a DT or the HDP infrastructure, this may have the advantage that information that is not available at the mobile apparatus may be taken into account, including information on other mobile apparatuses. Furthermore, the processing load at the mobile apparatus may be reduced, if some criterion is monitored at a stationary apparatus.

If the actions of the method of FIG. 2 are performed at the mobile apparatus, the at least one criterion monitored by the mobile apparatus may relate for instance to a receipt of a re-configuration message from a stationary apparatus. The at least one criterion monitored by the mobile apparatus may further relate to sensor data. Such sensor data may comprise an indication of ambient temperature, an indication of a movement of the mobile apparatus, an indication of an amount of ambient light, an indication of an applied physical force to the mobile device and/or other sensor data. It may be provided that a higher transmit power level is used when a light sensor lights detects that lights are turned on, when a movement detector detects that the apparatus is moving, or when a temperature sensor indicates that the mobile apparatus is held in a person's hand. It may be provided that a lower transmit power level is used when the mobile apparatus is attached to a shopping cart or trolley and a temperature sensor indicates that the mobile apparatus is outdoors at a low temperature. This can help ameliorate the especially fast power drain that is typically experienced at low temperatures. The at least one criterion monitored by the mobile apparatus may further relate to an indication of a position of the mobile apparatus. It may be provided that different power levels are used at different positions. The mobile apparatus may receive the indication of its location from a positioning server via some connection, e.g. an Internet connection, or it may compute its location by itself. The at least one criterion monitored by the mobile apparatus may further relate to an indication of remaining battery energy available to the mobile apparatus. In the case of little remaining battery energy, the power level of transmissions may be reduced in order to extend the remaining life span of the battery and possibly of the mobile apparatus as a whole. The at least one criterion monitored by a mobile apparatus may further relate to a current time of day and/or a current date. For instance, the position of the mobile apparatus may only be relevant at certain times of day, and the power level may be reduced significantly at other times. The at least one criterion monitored by the mobile apparatus may further relate to a current time of day and/or a current date. For instance, the position of the mobile apparatus may only be relevant during week days, not on Sundays or public holidays, and the power level may be reduced significantly at other times. The at least one criterion monitored by the mobile apparatus may further relate to an amount of traffic on the air interface. The at least one criterion monitored by the mobile apparatus may further relate to an amount of detected packet collisions on the air interface. In case there is a high amount of traffic or a high amount of detected packet collisions, the power level of transmissions may be decreased to reduce the amount of collisions.

The at least one criterion monitored by the mobile apparatus may also be any combination of a plurality of criteria, which may or may not include one or more of the criteria mentioned above.

The mobile apparatus may monitor the at least one criterion only in predetermined time intervals and/or for a predetermined period after each transmission of information. This may have the effect that the additional battery energy required for the monitoring is limited.

If the actions of the method of FIG. 2 are performed at least at a stationary apparatus, the at least one criterion monitored by the stationary apparatus may relate to a position or a movement of the mobile apparatus. In certain predetermined areas, a particularly high or low accuracy of positioning may be desired, and the power level of transmission may be adjusted correspondingly; or it may be desired to adjust the power level to the speed of the mobile apparatus to obtain a location estimate of sufficiently high accuracy. The criterion monitored by the stationary apparatus may further relate to a current time of the day and/or a current date. A high accuracy of positioning might only be desired at certain times, as mentioned with reference to the criteria that may be monitored by a mobile apparatus. At other times the power level of transmissions may thus be reduced. The at least one criterion monitored by the stationary apparatus may further relate to information received, at the stationary apparatus, from the mobile apparatus. Such information may include for instance a current battery status of the mobile apparatus. If such information is evaluated at the stationary apparatus, processing load at the mobile apparatus may be reduced.

It may be noted in general that if a monitored criterion relates to a particular parameter, the actual criterion may be for instance the current value of the parameter exceeding or falling short of a predetermined threshold value or lying within a predetermined range of values. If a criterion relates to a received re-configuration message, the criterion might be for instance receipt of an indication of a new transmit power in the message.

A re-configuration message may be provided by a stationary apparatus for transmission to an individual mobile apparatus, to a specified set of mobile apparatuses or to all suitable mobile apparatuses in the coverage area of a positioning infrastructure to which the stationary apparatus belongs.

Certain embodiments may provide that the mobile apparatus transmits a confirmation of adjustment of transmit power, a report of failure of an adjustment of transmit power, an indication of an adjusted transmit power value, an energy status of a battery of the mobile apparatus, and/or an indication of a status of motion of the mobile apparatus. The status of motion may be determined for instance by a motion detector associated to the mobile apparatus. The status of motion may be simply "stationary" versus "moving", or more comprehensive information.

The apparatus 100 of FIG. 1 may be for instance a chip, a circuitry, an integrated circuit, a printed circuit board, a plug-in module, a tag, a mobile device or a stationary device, or any other kind of device implementing the indicated features.

If the apparatus 100 is a tag or a mobile device comprising such a tag or a module for use in such a tag, the tag may be for example a location tag using Bluetooth, but equally any other type of location tag, for instance an active RFID tag. The tag may be integrated within a mobile communications device. For instance, the tag may be constituted by a Bluetooth Low Energy (BT LE) chip or module that is included within a mobile phone, smartphone, tablet computer, media player, camera or other such portable consumer electronics device with communications, for instance Bluetooth, capabilities. The tag may be provided as a tag emulation function of a communications chip or module, for instance operating according to BT LE.

If the apparatus 100 is a stationary device or a module for use in a stationary device, the stationary device may be for instance a positioning server, a management server or an application server of a positioning infrastructure. The positioning infrastructure may be a Bluetooth based infrastructure, but equally an infrastructure for any other type of positioning system, for instance an infrastructure of an RFID based positioning system. It can further be for instance, though not exclusively, an indoor positioning infrastructure.

As mentioned above, an asset tracking systems can make use of BT LE technology. BT LE supports a bi-directional data exchange. BT LE based systems may use a broadcast channel for their asset tracking mode. Such a broadcast channel may also be used for causing a reconfiguration of tags when the same reconfiguration message is to be sent to several or all tags in the coverage area. However, there are also some dedicated channels available with BT LE. These dedicated channels may be used for communicating a reconfiguration message to a particular tag or to a limited group of tags and/or for obtaining status information from a tag.

In an exemplary embodiment, apparatus 100 may comprise one or more additional components. It may comprise a battery. It may further comprise a sensor like a temperature sensor, a light sensor or a movement sensor, etc. It may comprise a time monitor, that is, a component configured to monitor time and/or date. It may comprise a circuitry configured to detect a battery status of a battery providing a power supply to the mobile apparatus and/or a circuitry configured to detect a status of the air interface. It may comprise a user interface. If apparatus 100 is or belongs to the mobile apparatus periodically transmitting information, it may comprise in addition a transmitter configured to transmit information via the air interface or a transceiver configured to enable an exchange of data via the air interface. If apparatus 100 is or belongs to a stationary apparatus, it may comprise in addition for instance a transceiver configured to enable an exchange of data either directly with a mobile apparatus or indirectly via some other stationary apparatus, like a DT or some other kind of beacon or base station.

Exemplary use cases for embodiments of the invention include a tracking of shopping carts in supermarkets. A tag may for instance be incorporated as part of a trolley-mounted scanner that is used also for scanning barcodes of goods as the customer progresses around a store or supermarket. Such a tracking may provide valuable business information about how consumers move in the shop, how long they queue, etc. Alternatively, embodiments of the invention may be used by security organizations for locating their personnel in premises, such as airports or shopping malls, in order to be able to respond quickly to incidents.

Figure 3:
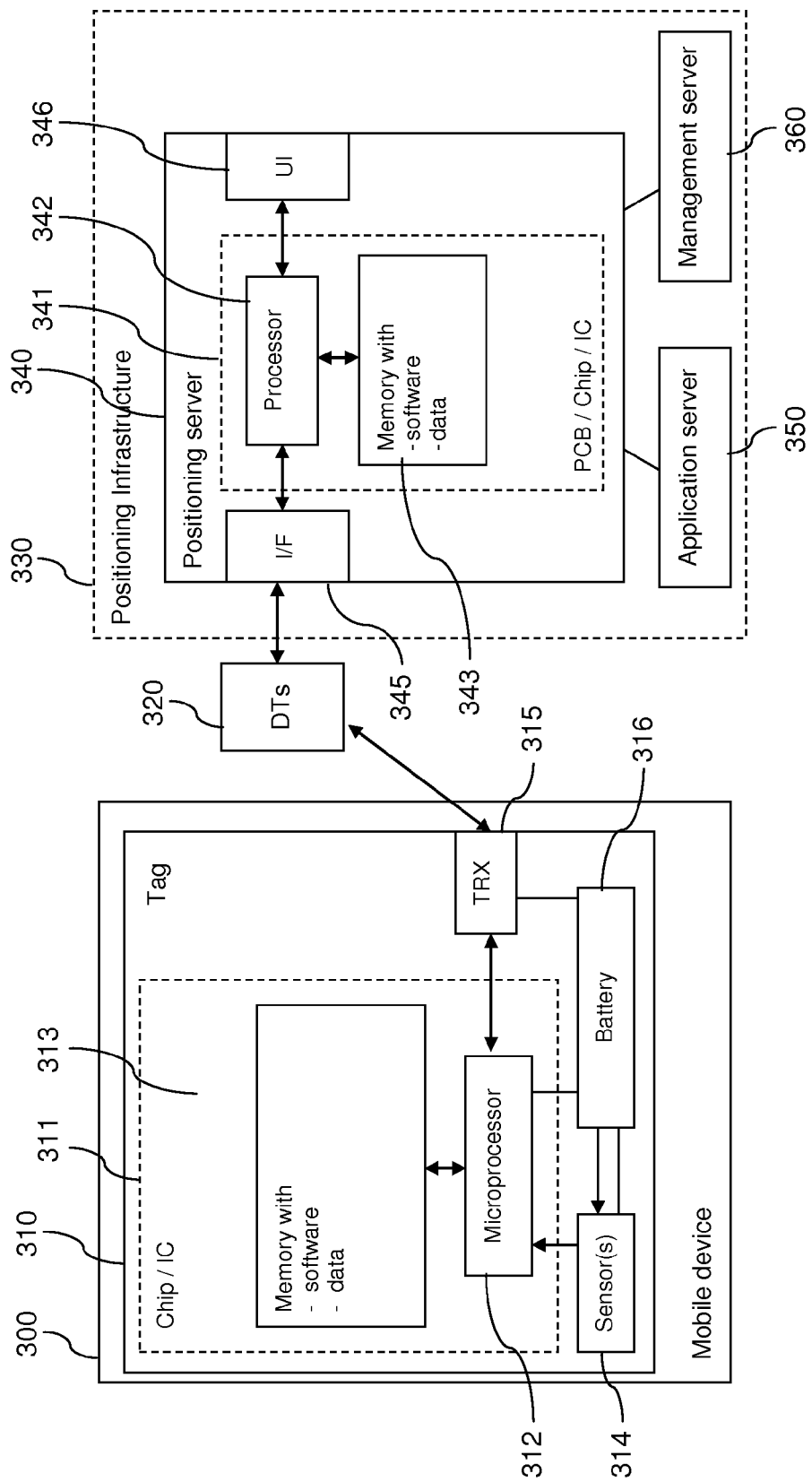
FIG. 3 is a schematic block diagram of a system according to various embodiments and aspects of the invention.

FIG. 3 is a schematic block diagram presenting an embodiment of a system according to aspects of the invention.

The system comprises a mobile device 300, a plurality of DTs 320 and, linked to the DTs 320, a positioning infrastructure 330, also known as an HDP infrastructure. The positioning infrastructure 330 includes a positioning server 340 and, linked to positioning server 340, an application server 350 and a management server 360. The positioning server 340, application server 350 and management server 360 may be combined into a single server, or two servers. Their functions may or may not be distributed over plural locations. Some or all of the functions may be provided by a cloud computing service provider.

By way of example, mobile device 300 is a shopping cart. Alternatively, it may be of a wristband for security personnel. Alternatively it may be some other mobile device that is to be tracked, for instance a mobile phone, smartphone, tablet computer, laptop computer etc.

Mobile device 300 comprises a location tag 310. Tag 310 may be for instance a location tag including a processor 312 and a memory 313 storing program code for execution by processor 312. Memory 313 may store in addition an identity (ID) of tag 310, a group identity of tag 310, fixed or adjustable values to be monitored for adjusting a transmit power, and an adjustable value indicating the transmit power that is currently to be used for a positioning packet, as well as various other data. The program code may comprise code for causing a transmission of a positioning packet including at least the identity of the tag. The program code may be configured to cause positioning packets to be transmitted at a rate according to a schedule having any suitable form. The program code may comprise in addition code for monitoring a criterion for adjusting the transmit power and for causing an adjustment of the transmit power, for example by changing the stored power transmit value.

Tag 310 may further comprise a battery 316 that is connected to all components of tag 310 requiring a power supply. Tag 310 may further comprise one or more sensors 314. Such sensors 314 may include for instance an accelerometer, a light sensor, a temperature sensor, a sensor for sensing the battery state and/or a sensor for sensing the situation on the air interface. Tag 310 may further comprise a transceiver (TRX) 315 configured to transmit and receive information via the air interface. Transceiver 315 is in this embodiment a BT LE transceiver, but may instead be any other kind of transceiver supporting a wireless exchange of data.

Tag 310 may be integrated within a Bluetooth™ module of a device, for instance a mobile phone, smartphone, tablet or laptop computer etc. Here, the transmission of positioning packets is an additional function of the Bluetooth module, which is configured to perform all the usual functions of Bluetooth modules.

Tag 310 may also have more than one transceiver 315 and those transceivers may also be of different technologies. Further on, it is conceived that the actual positioning occurs via one transceiver (e.g. BT LE) but a communication to adjust the transmit power of the positioning packets of information occurs via another transceiver (e.g. a WLAN transceiver).

Processor 312 may be a microprocessor. It is linked to memory 313, to sensors 314 and to transceiver 315. Some or all of the components of tag 310, for instance at least processor 312 and memory 313, may be integrated on a chip or in an integrated circuit 311, for example to form a microcontroller.

Each DT 320 comprises multiple antennas configured to receive positioning packets from tags. Each DT 320 may further be configured to identify a tag which transmitted a positioning packet from an identity included in the positioning packet and to calculate the direction vector from DT 320 towards the tag using its multiple antennas.

DTs 320 are configured to forward identity, direction and data included in a received positioning packet to positioning server 340. DTs 320 are configured also to measure signal quality of received positioning packets and to forward a measure of the signal quality along with the other data to the positioning server 340. Signal quality may be measured for instance as signal to noise ratio (SNR), bit error rate (BER) and so on.

DTs 320 may be configured to determine direction vectors only for positioning packets received on predetermined channels. Information that is received from tags on other channels may be forwarded without processing to positioning server 340. DTs 320 are further configured to transmit messages received from the positioning infrastructure 330 to one or more tags.

Positioning server 340 comprises a processor 342 and a memory 343 storing program code for execution by processor 342. Memory 343 may store in addition other data, for instance tracks of various tags. Other data that may be stored in memory 343 is described below. Memory 343 may also be used for buffering data received from DTs 320.

The program code may comprise code for determining the position of a tag based on information received from DTs 320. The program code may further comprise code for monitoring criteria for adjusting a transmit power of a tag or a group of tags and for causing an adjustment of the transmit power at one or more tags.

Processor 342 and memory 343 may be implemented in a chip, circuitry, printed circuit board (PCB), plug-in module or any other module 341. Positioning server 340 may comprise in addition an interface (I/F) 345 configured to receive information from DTs 320 and to transmit information to tags 310 via DTs 320. Positioning server 340 may comprise in addition a user interface (UI) 346 configured to enable a user to control the operation of positioning server 340. Processor 342 is linked to memory 343, interface 345 and user interface 346.

Application server 350 may be configured to receive from positioning server 340 identity information, position information and an accuracy indication for various tags, and to use this information as input to some application, for instance to an application evaluating how customers move through a shop or mall.

Management server 360 may provide management functionality for the system. It is to be understood that the handling of the transmit power adjustment may also be implemented for example in management server 360 instead of positioning server 340.

An exemplary operation in system of FIG. 3 will now be described with reference to the flow chart of FIG. 4. Tag 310 is caused by processor 312 to perform the actions presented on the right hand side of FIG. 4 when executing program code that is stored in memory 313. Server 340 is caused by processor 342 to perform the actions presented on the left hand side of FIG. 4 when executing program code that is stored in memory 343.

Tag 310 periodically transmits positioning packets including at least the identity of tag 310. DTs 320 receive the positioning packets, extract the identity and any other information, calculate the direction vector of the respective transceiver 320 towards tag 310, and provide an indication of the identity of tag 310, of the direction vector and of the accuracy of the vector to server 340. Server 340 determines the position of tag 310 from the information received from one or several DTs 320 (actions not shown in FIG. 4).

Server 340 moreover monitors at least one criterion that may call for an adjustment of the current transmit power of the positioning packet of tag 310 (action 441). Based on the monitoring, server 340 decides whether an adjustment may be required (action 442). If an adjustment may be required, server 340 assembles a re-configuration message and sends it to tag 310 in order to cause an adjustment of the transmit power (action 443). Optionally, server 340 may receive feedback information from tag 310, including e.g. information on a current battery status or other information (action 444). This information may be considered as well in the monitoring of at least one criterion in action 441.

Tag 310 monitors as well at least one criterion that may call for an adjustment of the current transmit power used for periodically transmitting positioning packets (action 412). The criterion may relate only to data that is obtained at tag 310, for example from sensors 314. Alternatively or in addition, it may relate to re-configuration messages received from server 340 (action 411). If the at least one criterion is met, tag 310 determines a new transmit power (action 413) and causes an adjustment of the transmit power (action 414), for instance by setting a corresponding value in memory 313. Optionally, tag 310 may send a feedback on the adjustment and/or some sensor data to server 340 (action 415).

The tag 310 is configured to disable automatic frequency hopping (AFH) is enabled or employed. This can be achieved by the infrastructure including a disable AFH command in positioning messages transmitted to tag 310. This can have an effect of improving the reliability of reception of positioning packets in situations that might be considered normally to involve interfering transmissions. This is particularly relevant to embodiments in which the tag 310 is part of a Bluetooth chip or module that is used for communication other than communication needed for positioning.

Exemplary details of the operation will be presented in the following.

Update Strategy

At first, an update strategy is determined that is suited to achieve one or more aims, in order to best implement tag 310 and server 340 accordingly.

It may be an aim to optimize the battery life of tag 310. There may be some target for energy, for instance that battery 316 of the tag 310 should last for one year. In addition, there may be some target for accuracy, for instance that a shopping cart should be tracked with the accuracy of 5 meters. For optimizing the battery life, these targets must be combined using some strategy that depends on the particular use case. For example, a shopkeeper may only be interested in knowing how many customers are waiting in the queue for cashier desks, while an airport security may generally need a very accurate location of its security personnel. In the former case the energy is an issue since changing the battery for a large number of tags in shopping carts may be laborious. In the latter case, the personnel may easily replace or recharge the battery of the tag or the tag may be powered from a battery of their communications device (mobile phone or other radio device, for instance), which is charged. It may be another aim to reduce the processing load at the positioning infrastructure and/or to improve the quality of received positioning packets.

Some criteria that may be considered when determining the tag update strategy for achieving respective aims include the following.

For certain embodiments, it may of advantage to adjust the transmit power of the tag update depending on the location of tag 310.

Some areas may be considered as "parking areas" where the tag's location is of relatively little interest. For example, if tag 310 is attached to a shopping cart 300, then the storage area for shopping carts may be considered as an area of low interest.

It is also possible that some areas are considered as high interest areas. For example, a DT 320 may be placed above the entrance or exit of a shop and when reaching this area, tag 310 may be configured to transmit positioning packets with a higher transmit power for a certain period of time.

An area may be of interest only in the presence or absence of some other criterion. For instance, in the case of a tag incorporated as part of a trolley-mounted scanner that is used also for scanning barcodes or reading RFID tags attached to goods as the customer progresses around a store or supermarket, an area near a store exit may be of high interest when the customer has not completed a checkout procedure. In this case, an alarm may be raised.

Also, the transmit power of the tag 310 may be dependent on location for some reason other than the level of interest. For instance, if the tag 310 is detected to be at a location where its positioning packets may be received by DTs 320 on a floor different to the tag's location (for instance because the tag is located with an escalator aperture in a straight line between the tag 310 and a DT 320 on an adjacent floor), the transmit power of the tag 310 may be reduced so as to reduce the possibility that positioning packets from the tag 310 will be received by the DT 320 on the different floor.

In some embodiments, the transmit power is adjusted depending on time and date. For example, when the shop is closed, tag 310 may be re-configured to reduce its transmit power.

In some embodiments, transmit power is adjusted depending on internal parameters of tag 310, such as sensor data. For example, tag 310 may be able to measure its remaining battery energy and report this to positioning infrastructure 330. The transmit power may then be caused to be adjusted according to the current battery status. For instance, a tag with low battery power remaining may never transmit positioning packets at more than half power.

Alternatively or in addition, data about the movement of tag 310 may be used as a criterion for adjusting the transmit power. For example, when no movement is detected, the transmit power may be set to a relatively low level, while during movement it may be set to a higher level. It should be noted that acceleration, speed and/or movement can be detected either using a local sensor 314 of tag 310, or tracked positions of tag 310 determined by the positioning infrastructure 330, or both. Alternatively or in addition to a movement of tag 310, the speed of tag 310 may be an additional criterion. In this case, positioning infrastructure 330 may calculate the speed or velocity of tag 310 based on determined and tracked positions and cause a corresponding adjustment of the transmit power of the positioning packets. For example, a slowly moving shopping cart 300 may be tracked with half power transmissions, but a fast moving one may be tracked with full power transmissions. Positioning infrastructure 330 may also have some target accuracy for the asset tracking and calculate the minimum transmit power of the positioning packets of tag 310 to achieve this accuracy.

In some embodiments, the transmit power of the positioning packets is adjusted depending on the quality of the location update. The quality of tag location updates may change significantly depending on various factors. Some updates may be good or poor, depending on radio interferences on the air interface between tag 310 and DTs 320, the distance of tag 310 from DTs 320, etc. If tag 310 has poor quality continuously, then the transmit power of positioning packets by tag 310 may be caused to be dropped in order to avoid a waste of battery 316, or increased in order to try obtaining at least a few good position fixes.

In some embodiments, the transmit power of positioning packets of tag 310 is adjusted depending on available tracking information for other tags. For example, during busy hours, a shop may have sufficient tags moving around to provide enough information about customer flows. In this case some tags may be re-configured to reduce their transmit power, since their information is not needed.

In some embodiments, the transmit power of positioning packets is adjusted depending on the number of active tags. There is a limit to the bandwidth of the (BT LE) air interface that can be exceeded by too many active devices in the used radio spectrum, including for example location tags, WLAN devices and such like. Tag 310 may be configured to change its transmit power of positioning packets triggered by a re-configuration message from positioning infrastructure 330. Concentration of too many tags in the coverage area of a single DT 320 can occur especially in an area that is covered by multiple DTs 320.

Finally, it should be noted that the processing that is required for causing an adjustment of the transmit power of positioning packets consumes extra energy in tag 320. In particular, listening to re-configuration messages on the air interface, and possibly transmitting some extra message related to a transmit power adjustment, increases the energy consumption at tag 320. In addition, the processing of received re-configuration messages adds overhead at tag 320. Thus, a re-configuration message based update strategy may also address how often the tag should listen to re-configuration messages and how often the transmit power should be adjusted.

The eventually selected update strategy may be based on a combination of the approaches listed above. The final update strategy includes for instance a specification which criteria are monitored by which entity, what is the desired effect on the transmit power of positioning packets or on a follow-up criterion when it is detected that a criterion is met, and which tags are to receive a respective re-configuration message by infrastructure 330, if any.

Positioning Infrastructure

Once the update strategy has been defined and positioning infrastructure 330 is to be involved in the strategy, positioning infrastructure 330 may be implemented accordingly. Positioning infrastructure 330 may have some existing element that can be used as well for re-configuring the transmit power of a positioning packet by the tags. Such an element may be for example positioning server 340 that computes the respective coordinates of the tags 310 based on the information received from DTs 320, as in the embodiment of FIG. 3. There may also be a dedicated management server 360 that is used for maintaining the positioning system, which may be used as well for causing an adjustment of the transmit powers of positioning packets by the tags 310. Furthermore, the re-configuration strategy may be defined manually or automatically in positioning infrastructure 330.

When the update strategy has been implemented, positioning infrastructure 330 monitors criteria based on the selected update strategy. Once the criteria required for this strategy (e.g. time and/or location) are fulfilled, a decision about a re-configuration is made. A re-configuration message is then sent via one or more DTs to one or more tags.

If all available DTs 320 try to send a re-configuration message at the same time, this might result in collisions on the air interface. Infrastructure 330 may therefore select a single DT for sending the commands to the tags. Infrastructure 330 may select for instance the DT closest to a tag 310 for forwarding the re-configuration message to this tag.

A re-configuration message may cause an adjustment of transmit power in various ways.

The re-configuration message may be a simple command that contains the absolute transmit power (e.g. in dB) or a power setting (e.g. power level 3).

Alternatively, the re-configuration message may cause an adjustment of transmit power by means of some other parameters, for example a target battery lifetime (e.g. six month operating time). The tags 310 may be configured to calculate a suitable transmit power for the positioning packets based on the current battery status.

Alternatively, the re-configuration message may comprise an update command that indicates only a desired change of transmit power, e.g. an increment or decrement in power level, or an increase or decrease of two steps.

Alternatively, the re-configuration message may provide some policies or rules for adjusting the transmit power used by the tags for positioning packets. For example, the re-configuration message may provide some range of transmit power (e.g. in dB), and then the tags can determine a suitable transmit power based on some local parameters.

A command conveyed in a re-configuration may also be indicated to be of temporary validity. In this case, the tag is instructed to use a new transmit power for some period of time only. For example, the tag may be asked to use a high transmit power during the next 60 seconds before returning back to a normal transmit power.

Finally, the positioning infrastructure may optionally receive some feedback from the tag, for instance in the form of an indication whether or not the re-configuration was successful, an indication of the tag's new transmit power, or an indication of the energy status.

Tag

The tag 310 may be configured having regard to the update strategy.

If the update strategy provides for re-configuration messages, tag 310 is configured to listen to re-configuration messages. There are various options for limiting the additional energy that is spent in waiting for re-configuration messages. For example, tag 310 may listen to the reconfiguration messages only at some predefined periods, for instance immediately following transmission of a positioning packet. Tag 310 is further configured to determine a new transmit power once it receives a re-configuration message.

Depending on the update strategy, tag 310 may also be configured to monitor internal parameters, such as sensor data, battery energy etc., as well as to monitor other types of parameters like air interface traffic. It is to be understood that means for determining the battery status involves sensing with sensors.

If tag 310 is to monitor the battery status, the tag may comprise hardware configured to estimate the available energy in the battery 316 based on sensor 314. This may be accomplished with various approaches known in the art of energy and power management. For example, an analog-to-digital (AD) converter may be used for measuring the battery voltage and a circuitry may be provided for calculating the remaining battery energy. Alternatively, it would be possible to use simple comparators providing discrete estimations (e.g. above 60%, above 30%, above 5% of the original battery energy) as sensor 314. Then, tag 310 may comprise rules handling the information provided by the hardware. Such a rule might be for instance: "If the remaining battery energy is below 30%, drop transmit power to power level 3, otherwise use power level 5", or similar. The battery status may also be reported to positioning infrastructure 330 in the transmitted packets, for instance on a regular basis or whenever some threshold value is reached.

If the update strategy provides that movement is a criterion to be considered by tag 310, tag 310 is configured to adjust the transmit power based on a detected movement, for example an acceleration value provided by an accelerometer as an exemplary sensor 314. For example, tag 310 may transmit on a low power until movement is detected. Tag 310 may also be configured to evaluate provided movement data based on some more sophisticated algorithms. For example, it may be checked, if a movement shown by accelerometers is a movement that would be seen by positioning infrastructure 330. For instance, a human being may swing himself or may swing his arm. This produces accelerometer activations, but this might not be detected as an actual movement by positioning infrastructure 330. Therefore, such kind of movement might be filtered by tag 310 and not be considered as a movement that should result in a higher transmit power of the positioning packet. Tag 310 may also inform positioning infrastructure 330 about the detected motion, for instance in the positioning packets. For example, tag 310 may reduce the transmit power and inform positioning infrastructure 330 that it is not moving. The information may be limited to one bit in the positioning packets; the bit may have for instance a value of "0" for indicating that tag 310 is stationary and a value of "1" for indicating that tag 310 is moving. When tag 310 is stationary, positioning infrastructure 330 may receive the packets from tag 310 with low transmit power and be sure that tag 310 is still alive and existing (e.g. not stolen). At the same time, positioning infrastructure 330 may reduce the computations as it does not need to update the location of a stationary tag.

In other deployments indoor positioning may be of lower priority than use of the BT LE radio spectrum for other purposes. For example, the use of wireless devices by airport passengers may be prioritized over the use of bandwidth by a positioning system tracking luggage trolleys. Thus when determining adjustments to update transmit power based on radio traffic monitoring, tag update strategy may distinguish between two or more types of bandwidth usage; for example, transmissions by location tags can be identified as such based on known bit patterns at the headers of BT LE packets generated by the tags.

Tag specific sensor data is most naturally processed in tag 310. However, in some cases it may be beneficial to process the sensor data in positioning infrastructure 330 and to send re-configuration commands to tag 310 that take account of this data. This may enable for instance a coordinated configuration of several tags by positioning infrastructure 330. For example, the battery voltage may be sent (very seldom) by tag 310 to positioning infrastructure 330. Positioning infrastructure 330 may then perform an energy estimation and return a new transmit power for the positioning packets to tag 310.

Tag 310 may be configured to cause an adjustment of the transmit power for example by replacing a parameter in a memory 313 of tag 310 provided to this end.

If the update strategy provides that infrastructure 330 makes use of feedback from tag 310 for generating re-configuration messages, tag 310 may send some information to positioning infrastructure 330. This may involve acknowledgement of the transmit power update, report of failure, an energy status or simply the new transmit power value. Such information may be sent as a part of the positioning packets or using some specially opened communication channel.

In addition to altering the transmit power of the tag, the interval between transmissions may also be adjusted.

The System

A message sent from the positioning server 340 to a tag 310 by way of a DT 320, or optionally by way of two or more DTs 320, includes certain information. The information may include an address of the tag 310. This may be the unique identifier of the tag. Alternatively or additionally, it may indicate a group in which the tag is a member. By configuring the tag 310 to listen for messages that are addressed to groups of which it is a member, configuration messages or policies can be sent to multiple tags 310 with fewer messages transmitted from the positioning server 340 and the DTs 320. By configuring the positioning server 340 to ensure that each tag 310 has confirmed a change in configuration, it can be ensured that each of the relevant tags 310 has adopted a desired transmit power level.

The message sent from the positioning server 340 to the tag typically will include either an absolute transmit power level for the tag, a change in power (either as an increase or decrease) or rules or policies for determining a transmit power level of the tag 310.

Alternatively, a message sent from the positioning server 340 to a tag may be a command to switch to a mobile centric mode. In this mode, the tag 310 determines its location from positioning packets that are transmitted by DTs 320 and does not transmit positioning packets from the tag 310 to the DTs 320. In the mobile centric mode, the task of calculating a position of the tag 310 is vested in the tag, and processing, communication and other resource burdens on the positioning infrastructure 330 are reduced.

The positioning packet sent from the tag 310 to a DT 320 includes a number of fields. Firstly, it includes positioning data. This is a sequence of bits that allow the DT 320 accurately to determine a bearing to the tag 310. For instance, the positioning data may comprise a sequence of 0101010101, or some variation thereof. The positioning packet also includes the unique identifier of the tag 310.

The positioning packet may also include the current transmit power of the tag 310. This information is stored in the positioning server 340 and may be used by the positioning server 340 to determine transmit power control settings for the tag 310. The data may also include a current transmit interval, which identifies the time between transmission of successive positioning packets.

The positioning packet may also include the current battery level of the tag 310, and may be represented in any suitable way.

The positioning packet may also indicate the transmit power levels that are supported by the tag 310, for use as described below.

The positioning packet may also indicate that success or failure in a change in configuration of the tag, relating to whether a change in configuration that was instructed by the positioning server was or was not successfully implemented at the tag 310. By configuring the positioning server 340 to retransmit configuration messages until a configuration change success message has been received from a tag, it can be ensured that the tag 310 adopts the transmit power level as instructed by the positioning server 340.

The positioning packet may also include other relevant information. For instance, it may indicate that the tag 310 is setting itself to a "dying" or "dead" mode. Upon detecting an indication that a tag 310 is entering into a "dead" mode, the positioning server 340 may provide a suitable indication through the user interface 300. It may also cease to send power level configuration messages to the tag 310. On detecting that a tag 310 is entering the "dying" mode, the positioning server 340 may be configured to adjust an update frequency and/or power transmit level of the tag through sending of a configuration message or a configuration policy.

It will be appreciated that different positioning packets transmitted by a given tag 310 may include different information. For instance, the positioning data and tag identifier may be included in every positioning packet. Some other information, for instance the current transmit power and the current transmit interval, may be transmitted relatively frequently, although perhaps not in every positioning packet. Other information, such as the supported transmit power levels and the other relevant information, may be transmitted as and when required. Other information, for instance the success or failure of configuration changes and the current battery level, may be transmitted only in response to events, for instance a relevant change in battery level or the generation of a response message by the tag 310.

Operation of the DT 320 upon receiving a positioning packet will now be briefly described.

Firstly, the DT decodes the data modulated into the positioning packet. It then optionally performs a step of determining whether the tag 310 that transmitted the packet, as can be identified from the tag identifier included in the positioning packet, is not excluded by the positioning infrastructure 330. If the tag 310 is excluded, the positioning packet is discarded and no further action is taken. If the tag 310 is not excluded, the DT 320 may measure the signal quality of the signal including the positioning packet. The quality may be recorded as signal to noise ratio (SNR) for instance, or may take some other suitable form such as bit error rate (BER).

The DT 320 may then determine a bearing to the tag 310. Alternatively, the DT 320 may sample the received signal, optionally part-process the sampled signal, and provide the result to the positioning server for calculation of a bearing from the DT to the tag 310 by the positioning server 340.

The DT 320 sends to the positioning server 340 the contents of the decoded message, the measure of quality of received signal, for instance SNR, and the calculated bearing or the samples (part-processed) as appropriate.

Upon receiving such a message from a DT, the positioning server 340 examines the data it holds for the tag 310. It then determines whether it has any messages for the tag 310 and, if so, forwards them to the DT 320 from which the message originated for forwarding on to the tag 310. Alternatively, the positioning server 340 may be configured to provide DTs 320 with messages for tags 310 that are known to be located close to the DTs 320. In this way, the DTs 320 can be configured to provide the messages to the tags 310 directly in response to receiving positioning packets therefrom. This reduces the amount of time needed between receiving a positioning packet from a tag at a DT and the DT then transmitting a message to the tag 310. In such embodiments, the tag 310 can be configured to have a listening period immediately following the transmission of positioning packets that is relatively short, for instance of the order of a few milliseconds.

For each tag 310, the positioning server 340 stores in the memory 343 data as follows.

Firstly, the data includes an identifier that uniquely identifies the tag 310. Secondly, the data includes information that identifies one or more groups of which the tag 310 is a member. This can be termed group membership data. The tag can belong to plural groups simultaneously.

Thirdly, the data includes the last known location of tag 310. Optionally, the data also includes the time to which the location relates. The data may optionally include a number of previous known locations and further optionally also the times of those locations.

The data may include supported transmit power levels. This indicates the power levels at which the tag 310 may transmit. This may be stored in terms of dBm, or as a numerical value indicating the number of power levels, for instance. Example power levels that are supported by a tag 310 are 0 dBm, −6 dBm, −12 dBm and −18 dBm.

The stored data also includes a current power level of the tag 310. This may be indicated for instance by a dBm value or in some other way.

Fifthly, the information includes a quality of the last location update. This may be stored in terms of a degree of confidence that the last location is an accurate calculation, may be represented as information representing a resolution, or may indicate a quality metric of received copies of the positioning packet on which the location was calculated, for instance. The data may additionally include quality metrics of previous location updates.

The information stored in the positioning server 340 may also include a distance between the last known location of the tag 310 and the nearest DT 320. This may be represented in absolute terms, i.e. including a vertical separation, or it may be represented only in terms of the horizontal distance between the tag 310 and the DT 320.

The information also includes an identity of the nearest DT 320.

The information may also include a list of DTs 320 that received the positioning packet most recently transmitted by the tag 310. This information may be derived from an inspection of data that is received at the positioning server 340 from the DT 320.

The data may also include an indication of whether the tag 310 is moving. It may also include an indication of the speed of movement. This can be termed dynamic status information.

The information may also include any group membership that is user defined. Group membership may be user defined by an operator of the positioning server, through the user interface 346. Alternatively, group membership may be defined by the user of the tag 310, particularly if the tag 310 is implemented as part of a mobile phone, smart phone, tablet or laptop computer 300.

Lastly, the data includes any messages that have been generated for the tag 310. These may be stored directly along with the other data relating to the tag 310, or alternatively the data may include a pointer to the message, which is stored at some other location in the memory 343.

Some or all of the above information may be stored in the positioning server in a given embodiment.

Separately of the data relating to specific tags 310, the positioning server 340 records other information. This other information includes the number of tags from which each DT 320 receives transmitted positioning packets from tags 310. It also includes a CPU load of the processor 342. It also includes a time of day and also day of the week, which may be derived in any suitable way. It also includes information indicating the utilisation of data transmission resources, this being the bandwidth of communication between the positioning server 340 and the DTs 320.

In some embodiments, the positioning server 340 is configured to use the information stored therein to allocate tags 310 to groups. In some embodiments, the positioning server 340 is configured to use the data stored therein relating to tags 310 to determine transmit power levels for groups of tags. In some embodiments, the positioning server 340 is configured to use the data stored therein relating to tags 310 to derive rules or policies for individual tags or groups of tags.

In some embodiments, the positioning server 340 is configured to use the data stored therein to allocate tags 310 to groups and to determine power settings for the tags 310 in a group. In other embodiments, the positioning server 340 is configured to use the data relating to tags 310 stored therein to allocate tags 310 to groups and to set policies for transmit power of the tags 310 of a group. Examples will now be described.

As indicated above, a tag 310 may be allocated to a group by a user of the positioning server 340 through the user interface 346 and/or through a user of the tag 310. Additionally, the positioning server 340 may allocate tags 320 to groups automatically.

For instance, the positioning server 340 may be configured to identify tags having a location within a predefined area and to allocate all of those tags to a group. As an example, the predefined area may be parking area near the entrance of a shop, in which shopping carts may be parked whilst awaiting collection by a shopper. In such a way, the positioning server 340 can place all of the tags 310 that are located in the parking area in a parked group. The predefined area may alternatively be near a stairwell, in a location where reception of positioning packets by DTs on another floor might ordinarily be expected. As another example, the predefined area may be a cash office and tags that are in a cash box group, denoting that they are associated with cash boxes, can be configured to transmit with high power when the tag is detected to have left the cash office. Such tags 310 may be configured not to transmit at all prior to leaving the predefined area. Similarly, tags 310 in a high value goods group can be configured to transition to a high power mode upon leaving a warehouse area.

The positioning server 340 may allocate tags 310 to groups depending on their dynamic condition. For instance, all stationary tags may not be included in a dynamic tag group. All relatively slow moving tags may be placed in a slow moving tag group, and all relatively high speed tags may be placed in a high speed tag group. By configuring the positioning server 340 to adjust the transmit power of tags 310 in groups according to their dynamic condition, the transmit powers of tags 320 in those groups may be controlled with a relatively small number of reconfiguration message transmissions.

Additionally, by providing reconfiguration messages in this example that include instructions to change a transmit power level, rather than specifying a particular transmit power level, the tags 310 in a dynamic condition group may adopt a power level that has regard also to other factors, for instance factors that are determined locally at the tag 310.

Tags may be allocated to groups based on their battery level, similarly to the allocation of tags based on dynamic status as described above.

The positioning server 340 may be configured to allocate tags 310 to groups randomly. For instance, if the positioning server 340 determines that the number of tags 310 in a particular area is too high, the positioning server may allocate a number or proportion of those tags to a low power group and send reconfiguration messages to the tags in the lower power group. For instance, the positioning server 340 may instruct 20, 30 or 40% of tags randomly in an area to be allocated to the low power group.

Tags 310 in a group may be caused to change power level in response to a user input through the user interface 346 of the positioning server 340. For instance, a user may command that all tags 310 in a first aid group or security personnel group transmit with increased power, optionally maximum power, in response to a user input.

The positioning server 340 may be configured to group tags 310 together based on a physical grouping of the tags. For instance, in relation to a shipment containing several packages, each package having their own tag 310, the positioning server 340 may define one group. This may be defined in response to a user input or may be defined automatically by the positioning server 340 upon inferring that the tags are co-located. In such a group, one tag may be reconfigured as a high power tag, by which its location can be determined accurately and reliably, with the other tags in the group being configured as low power tags, thereby preserving their battery life and reducing burden on the positioning server 340.

On allocating a tag 310 to a group, the group membership information stored in the positioning server 340 is updated. Also, the tags 310 are informed of their group membership. For instance, this can be performed by generating a message indicating the group membership for the tag, which may be stored in the positioning server 340 as indicated above. At the next opportunity for transmitting a message to the tag 310, the message indicating the group membership is transmitted to the tag.

Upon detection by the positioning server 340 that a tag 310 has left the parking location, the group membership information is updated and a message is generated for the tag 310 informing the tag of its updated group membership status.

The positioning server 340 may be configured to determine a power setting for each of the tags 310 in the group. For instance, the positioning server 340 may determine that for all tags in the parking area a transmit power of −12 dBm is appropriate. This may be communicated to the tags either as an instruction to adopt the appropriate power level or as part of a policy that is then implemented by the tag 310.

The positioning server 340 may also be configured to allocate tags to a group when it is detected that a number of tags having the same nearest DT 320 exceeds a threshold. For instance, if a DT 320 is considered to have a maximum capacity of 100 tags, a threshold of 80 tags may be allocated to that DT. On detecting that the number of tags that have that DT 320 as the nearest DT exceeds the threshold of 80, the positioning server 340 may be configured to allocate all of the tags that have that DT 320 as the nearest DT to a special group. Group membership may be communicated to the tags 310, as described above. The positioning server 340 may then be configured to cause the tags 310 of the new group to adopt a relatively low transmit power level. This new transmit power level may be communicated to the tags 310 in the new group as above.

The positioning server 340 may also determine power settings and/or policies for individual tags 310.

For instance, for tags 310 for which it is detected that a relatively large number of DTs 320 receive the last transmitted positioning packet, the positioning server 340 may be configured to reduce the power setting. Reducing the power setting of such tags 310 will result in later positioning packet transmissions being received by fewer DTs 320. This has a number of positive effects. The first is that interference may be reduced, and DTs that are relatively remote from the tag 310 will also be able to receive transmissions from closer tags 310 with less interference. Additionally, this may result in less data being transmitted between DTs 320 and the positioning infrastructure 330. This reduces utilisation of the bandwidth between the DTs 320 and the positioning server 340. This may be achieved without any reduction in the accuracy or quality of the calculations of the location of the tag 310, in particular because it is the DTs 320 that are closest to the tag 310 that are able to determine the most accurate bearings to the tag 310. In addition to reducing the utilisation of the bandwidths between the DTs 320 and the positioning server 340, it also reduces the amount of processing required by the processor 342. The reduction in interference at a DT 320 that is relatively remote from the tag 310 is advantageous since it allows more accurate bearing estimations to tags 310 that are closer to the remote DT 320. It also reduces the possibility of such tags 310 needing to retransmit in order for their positioning packets to be correctly received by the remote DT 320.

The positioning server 340 may also determine a power setting for a tag 310 based on the information stored indicating whether or not the tag 310 is moving, and optionally also depending on the speed of movement. For instance, the tag 310 may have a transmit power level at rest that has been determined according to various criteria, including a default power level, the location of the tag 310, the locations of other nearby tags etc, and the power level is increased when the tag 310 is moving. The power level may, for instance, be increased by one step when the tag is detected to be moving slowly and by two steps when the tag is detected to be moving relatively quickly. If the tag 310 supports a relatively large number of transmit power levels, as is indicated by the data stored in the positioning server 340, then a relatively sophisticated algorithm may be used to determine a transmit power of the tag 310.

In addition to grouping tags 310, the positioning server 340 is configured to adjust power settings for individual tags and/or groups of tags based on information not specifically relating to tags 310. For instance, the CPU load of the processor 343 of the positioning server 340 is monitored. When the positioning server 340 detects that the CPU load exceeds a threshold, or that an average has exceeded a threshold over a period of time, the positioning server 340 may be configured to reduce the transmit power levels of some or all of the tags 310. Similarly, if the positioning server 340 determines that the utilisation of the bandwidth between the DT 320 and the infrastructure 330 exceeds a threshold, or that an average has exceeded a threshold over a period of time, the positioning server 340 may determine to reduce the transmit power of some or all of the tags 310.

Where the positioning server 340 stores information indicating a current transmit power level of a tag 310, this information can be taken into account when determining a new transmit power level for the tag 310. For instance, the positioning server 340 can be configured to refrain from sending a reduced power configuration message to a tag 310 that is already operating at a minimum transmit power level. Similarly, the positioning server 340 can be configured to refrain from sending an increased power configuration message to a tag 310 that is already transmitting at a maximum transmit power level. The positioning server 340 may utilise any information that is stored identifying transmit power levels that are supported by the tag 310, although if all tags 310 within a system have the same supported power levels then this may not be necessary.

The positioning server 340 is configured also to determine an appropriate transmit power level for mobile tags having regard to the quality of last location update information that is stored in the positioning server 340. If the quality falls below a threshold, the positioning server 340 may be configured to increase the transmit power level for the mobile tag 310. The threshold may be determined having regard to a general threshold that is applied to all or a majority of tags 310. Alternatively, the threshold may be specific to a tag 310 or a group of tags. For instance, tags belonging to a group of security tags may have a higher requirement for location calculation quality than tags that are associated with shopping carts. Conversely, if the quality of location calculation is above an upper threshold, indicating that a lower quality would be suitable, the positioning server 340 may be configured to send a reconfiguration message instructing a lower transmit power for the tag 310.

The positioning server 340 may allocate tags 310 to groups depending on their dynamic condition. For instance, all stationary tags may not be included in a dynamic tag group. All relatively slow moving tags may be placed in a slow moving tag group, and all relatively high speed tags may be placed in a high speed tag group. By configuring the positioning server 340 to adjust the transmit power of tags 310 in groups according to their dynamic condition, the transmit powers of tags in those groups may be controlled with a relatively small number of reconfiguration message transmissions.

The positioning server 340 may also adjust the power of the tags 310 based on the time of day. For instance, the transmit power of all tags may be reduced at a time corresponding to one hour after closing of a shop or shopping mall. Alternatively, the transmit power of tags in one group may be reduced and the transmit power of tags in another group may be increased. For instance, the transmit power of tags 310 that are associated with shopping carts may be decreased when a store or shopping mall is closed and at substantially the same time the transmit power of tags relating to security items, for instance high value goods or cash boxes, may be increased. As discussed above, updated tag power transmit levels can be communicated to the tags 310 in any suitable way.

In embodiments in which the positioning server 340 does not dictate transmit powers of the tags 310, or where the positioning server 340 does not dictate the transmit powers of the tags 310 all of the time, the tags 310 themselves may be configured to determine a suitable transmit power and operate according to that transmit power.

The tag 310 may determine a transmit power level based on the time of day. Time of day may be locally determined in any suitable way, or alternatively may be notified to the tag 310 by the positioning infrastructure in any suitable way. The tags 310 may be configured to determine a suitable power level based on the time of day on the basis of policies that are received from the positioning server 340.

The tags 310 may be configured to determine a transmit power level based on the power of the battery 316. This may be performed on the basis of policies set by and received from the positioning server 340.

The power level may be determined also based on whether the tag is moving. Movement may be determined locally by way of the sensors 314, or it may be notified to the tag 310 by the positioning server 340.

The tag 310 may be configured to determine its transmit power level based on the location of the tag 310. The location may be calculated by the tag 310 or it may be notified to the tag by the positioning server 340. In order to determine a power level based on location, the tag 310 is provided with information identifying areas and power levels for each of the areas. By comparing its location with the areas stored in its memory 313, the tag 310 determines a suitable transmit power level.

The tag 310 also may be configured to determine that it is "out of range" of the system and adjust its transmit power level accordingly. A tag 310 may determine that it is out of range for instance by determining that it has not received transmissions from any DTs 320 for a predetermined period of time, or this could instead be determined in any other suitable way. When the tag 310 is in the out of range mode, it is configured to transmit positioning packets at maximum power. The transmit frequency in such mode packets may be different to the transmit frequency in other modes. For instance, in the out of range mode, the frequency (rate) of transmission may be significantly lower than in other modes, for instance once every minute or less than once per minute, compared to many times per minute in other modes.

In embodiments in which the positioning server 340 dictates the power level of a tag 310, the positioning server 340 may be configured to notify the tag 310 of the power level on a periodic basis. Upon receiving such a notification, the tag 310 restarts a timer and adopts the appropriate transmit power level. The tag 130 is responsive to expiry of the timer to increase the transmit power level. This allows the tag 310 to avoid getting stuck in a situation in which the positioning server 340 is unable to communicate with the tag 310. By increasing the transmit power upon expiry of the timer, the possibility of a positioning packet being correctly received by a DT 320 is increased. Without this feature, a tag 310 may become lost in a low transmit power mode in such a way that the positioning server 340 is unable to calculate its position and is unable to communicate with the tag 310.

As mentioned elsewhere in this specification, the tags 310 may be configured to operate a receiver part of the transceiver 315 for a predetermined period after transmission of a positioning packet. By configuring the positioning server 340 and/or the DTs 320 to transmit messages to a tag 310 only immediately following reception of a positioning packet transmitted by the tag 310, construction of the tag 310 can be simplified and the power consumption of the tag 310 can be reduced. The receive period may take any suitable value, for instance 10 ms, 50 ms, 100 ms, 500 ms or 1000 ms.

Upon expiry of the timer, the tag 310 may immediately revert to maximum transmit power. Alternatively, it may gradually increase its transmit power over a period of time until it reaches the maximum or until it receives a new configuration message from the positioning server 340. The tag 310 is configured to restart the timer upon successful reception of a reconfiguration message that is addressed to the tag 310 either individually or with a group identifier.

Additionally, by providing reconfiguration messages in this example that include instructions to change a transmit power level, rather than specifying a particular transmit power level, the tags 310 in a dynamic condition group may adopt a power level that has regard also to other factors, for instance factors that are determined locally at the tag 310.

The maintenance in the positioning server 340 of data relating to tags 310, and of particular interest the last known location and time of location information, allows tags 310 to be registered to a database. This may be of particular use where each tag 310 is carried by a member of staff in an organisation since the data stored in the positioning server 340 then maintains a record of when the member of staff entered the location covered by the system and when they left the location, as well as tracking their location between those two times.

Similarly, shopping carts can be automatically registered. Additionally, tags 310 associated with shopping carts can be automatically configured into a low power mode when parked in a trolley parking area or in a warehouse, for instance.

As well as tracking staff members, shoppers, customers and such like may be tracked automatically by the positioning server 340. A customer may elect to be tracked by the positioning system 340 in any particular way. This may be performed, for instance, by a setting on their mobile device 300 or by a setting on the positioning server 340, which may be provided in any suitable way. It may alternatively be performed by the user accepting a request message that is generated by their mobile device 300 in response to receiving an invitation message from a DT 320, for instance provided at the entrance to a store or shopping mall.

Additionally, a tag may be associated with a usually static item such as a cash dispenser or ATM. If power to the ATM is cut as a thief attempts to remove it from its installed location, the tag can allow the location of the ATM to be tracked within the monitored area. In this case, the tag may be responsive to the detection of movement or a change in location to commence the transmission of positioning packets.

It will be appreciated that tags 310 can be provided with a default transmit power level. The default power level may be defined and loaded into the tag 310 during manufacture. Alternatively, it can be provided to the tag 310 by way of a reconfiguration message transmitted by the positioning server 340. However the tag 310 is initially provided with the default transmit power level, it may be changed by the positioning server 340 as appropriate. This can be particularly useful in embodiments in which tags 310 are configured to increase their transmit power level towards a default power level in the absence of receiving reconfiguration messages, in particular because it can allow the tags 310 to adopt a transmit power level that is appropriate having regard to the system in which they are operating.

Figure 4:
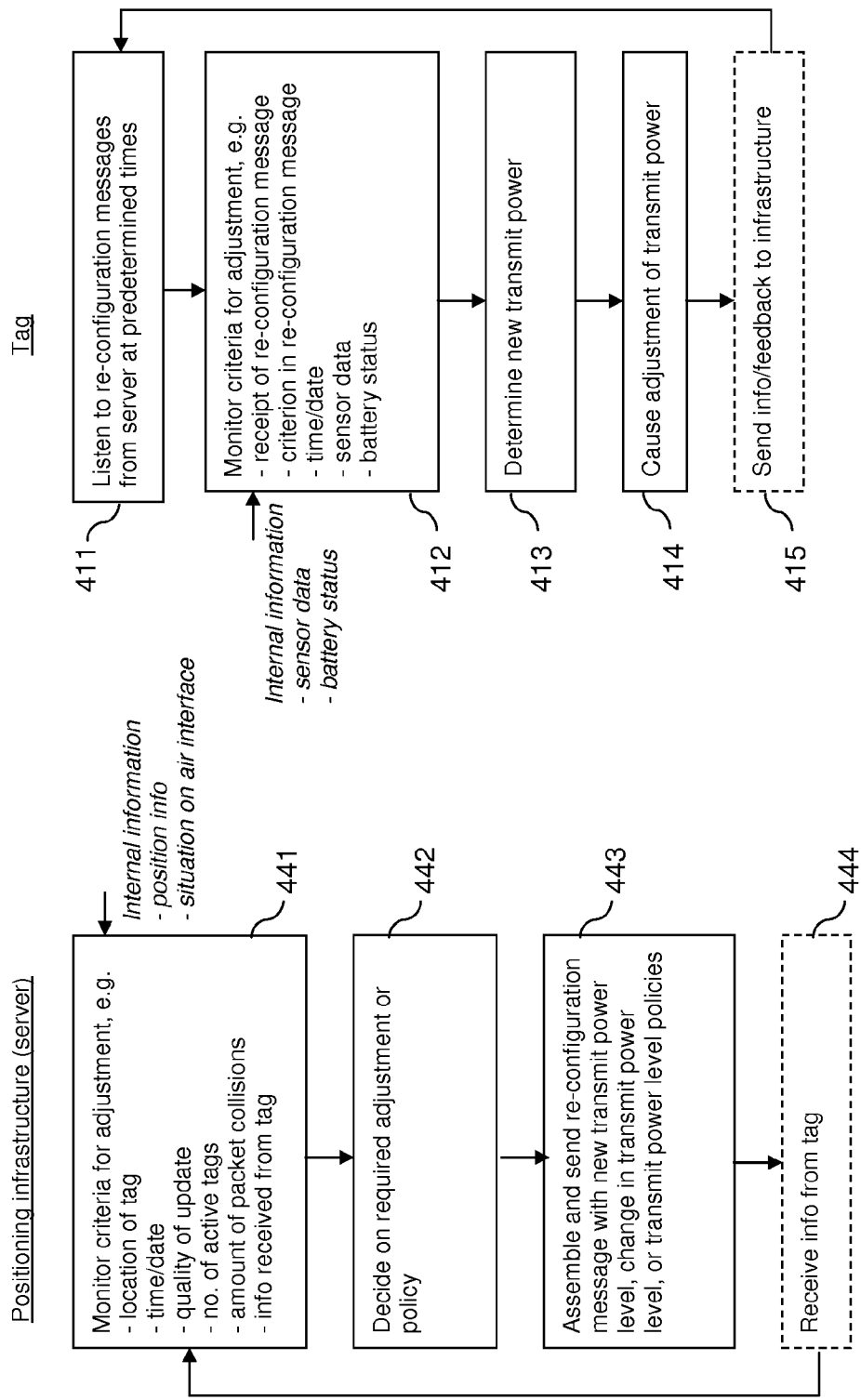
FIG. 4 is a flow chart illustrating an exemplary operation of the FIG. 3 system.

The embodiments presented with reference to FIGS. 3 and 4 provide that a positioning server 340 computes the position of mobile device 300; that is, the information periodically transmitted by the mobile device 300 is information excluding position information. They may comprise for instance exclusively an identification of tag 310, and optionally some feedback or sensor information as described above. It is to be understood that in other embodiments, mobile device 300 may be or comprise a smart device 310 that is configured to compute its own position based on signals transmitted by one or more directional transmitters 320. In such an embodiment, additional program code for computing the position may be stored in memory 313 for extraction and execution by processor 312. The computed position may then be transmitted periodically to infrastructure 330. In this case, the positioning infrastructure 330 is enabled to determine the position of device 310 by extracting the position information from signals received from device 310 and possibly by performing some format conversion or by mapping provided position details to the area definition of the area in which the positioning is performed. The determined position may then be used by the positioning infrastructure for tracking and/or evaluation.

Certain embodiments of the invention have the advantage that the energy consumption of a mobile apparatus is optimised, since a high transmit power only has to be used when actually required and/or when of advantage. That is, certain embodiments allow reducing the energy consumption at a battery operated mobile apparatus and thus extending the battery life of the apparatus and/or a reduction in the possibility of generating interference, while ensuring at the same time a satisfactory accuracy in the positioning of the mobile apparatus. Certain embodiments may also have the effect that a desired remaining lifetime of a battery is ensured, even if this means a certain compromise with respect to accuracy. In certain embodiments, the invention may have the effect that the power consumption of a battery operated mobile apparatus, like a location tag, is optimized such that the battery lifetime exceeds the expected lifespan of a tag in a typical asset tracking use case. In other embodiments, the invention may have the effect that the battery has to be exchanged at large intervals only.

In addition, certain embodiments allow reducing network and processing load in the infrastructure. Certain embodiments of the invention may further have the advantage that they allow handling a large number of mobile apparatuses in the same area by reducing the congestion of transmission channels on the air interface. Certain embodiments of the invention may further have the advantage that they allow adjusting the amount of transmissions to an available radio interface bandwidth, for example if other radio devices use the same radio spectrum as well.

Some of the energy saving benefits can even be achieved in systems implementing the method in a mobile apparatus only.

FIGS. 2 and 4 may also be understood to represent exemplary functional blocks of computer program codes for supporting a positioning of a mobile apparatus.

The processors used in any of the above described embodiments may also be used for various additional operations.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a tag or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a device.

Any of the processors mentioned in this text may be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text may be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102, processor 312 in combination with memory 313, processor 342 in combination with memory 343, or circuitry 311 or 314 can be viewed as means for monitoring at least one criterion for an adjustment of a transmit power of a positioning packet of information by a mobile apparatus via an air interface, the positioning packet enabling a determination of positions of the mobile apparatus; and as means for causing an adjustment of the transmit power, when it is detected that the at least one criterion is met.

The program codes in memory 102 or memory 313 or memory 343 can also be viewed as comprising such means in the form of functional modules.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

The invention claimed is:

1. A method, comprising:
   monitoring at least one criterion for an adjustment of a transmit power of a positioning packet transmitted by a location tag at a mobile apparatus, wherein the positioning packet is for use by a positioning service to calculate a position of the mobile apparatus; and
   when it is detected that the at least one criterion is met, causing an adjustment of the transmit power specifically of positioning packets transmitted by the location tag at the mobile apparatus.

2. The method according to claim 1, wherein the monitoring is performed at least by the mobile apparatus in predetermined time intervals.

3. The method according to claim 2, wherein the at least one criterion relates to receipt, by the mobile apparatus, of a re-configuration message from a stationary apparatus.

4. The method according to claim 2, wherein the predetermined time intervals are predetermined periods following each positioning packet transmission.

5. The method according to claim 1, wherein the monitoring is performed at least at a stationary apparatus, and wherein causing an adjustment of the transmit power comprises causing, by the stationary apparatus, a transmission of a configuration message to the mobile apparatus.

6. The method according to claim 5, further comprising the mobile apparatus starting a timer in response to receiving a reconfiguration message and increasing a transmit power upon expiry of the timer.

7. The method according to claim 1, wherein the criterion is monitored by a stationary apparatus and relates to at least one of:
   a position of the mobile apparatus;
   a dynamic status of the mobile apparatus;
   a current time of day;
   information received, at the stationary apparatus, from the mobile apparatus;
   a current battery status of the mobile apparatus; or
   a quality of transmissions received from the mobile apparatus.

8. The method according to claim 5, wherein the criterion monitored by the stationary apparatus relates to at least one of:
   time of day;
   a load placed on processing resources of the stationary apparatus;
   utilization of data transmission resources; or
   a number of mobile apparatuses from which positioning packets are received.

9. The method according to claim 3 wherein the re-configuration message indicates at least one of:
   a transmit power for the location tag at the mobile apparatus;
   a range of transmit powers for the location tag at the mobile apparatus;
   a change in a transmit power currently used by the location tag at the mobile apparatus; or
   rules or policies for adjusting the transmit power by the location tag at the mobile apparatus.

10. The method according to claim 3 further comprising transmitting, by the mobile apparatus, one or more of:
    a confirmation of adjustment of transmit power;
    a report of failure of an adjustment of transmit power;
    an indication of an adjusted transmit power;
    an energy status of a battery of the mobile apparatus;
    supported transmit power levels;
    an indication of a dynamic state of the mobile apparatus; or
    an indication of a mode of operation of the mobile apparatus.

11. An apparatus, comprising:
    a control circuit implemented in hardware or at least one processor and at least one memory including computer program code
    to monitor at least one criterion for an adjustment of a transmit power of a positioning packet transmitted by a location tag at a mobile apparatus, wherein the positioning packet is for use by a positioning service to calculate a position of the mobile apparatus; and
    a circuit implemented in hardware or at least one processor and at least one memory including computer program code for, when it is detected that the at least one criterion is met, causing an adjustment of the transmit power specifically of positioning packets transmitted by the location tag at the mobile apparatus.

12. The apparatus according to claim 11, wherein the monitoring is provided at least by the mobile apparatus.

13. The apparatus according to claim 11, wherein the at least one criterion relates to receipt, by the mobile apparatus, of a re-configuration message from a stationary apparatus.

14. The apparatus according to claim 11, wherein the mobile apparatus comprises a circuit implemented in hardware or at least one processor and at least one memory including computer program code for monitoring the at least one criterion in predetermined time intervals.

15. The apparatus according to claim 14, wherein the predetermined time intervals are predetermined periods following each positioning packet transmission.

16. The apparatus according to claim 11, wherein the control circuit implemented in hardware or the at least one processor and the at least one memory including computer program code to monitor the at least one criterion is provided at least at a stationary apparatus, and wherein the circuit implemented in hardware or the at least one processor and the at least one memory including computer program code for causing an adjustment of the transmit power comprises circuitry implemented in hardware or at least one processor and at least one memory including computer program code to cause, by the stationary apparatus, a transmission of a re-configuration message to the mobile apparatus.

17. The apparatus according to claim 11, wherein the mobile apparatus comprises a circuit implemented in hardware or at least one processor and at least one memory including computer program code to start a timer in response to a received re-configuration message, and further comprises a circuit implemented in hardware or at least one processor and at least one memory including computer program code to change a transmit power upon expiry of the timer.

18. The apparatus according to claim 11, wherein the criterion is monitored by a stationary apparatus and relates to at least one of:
   a position of the mobile apparatus;
   a dynamic status of the mobile apparatus;
   a current time of day;
   information received, at the stationary apparatus, from the mobile apparatus;
   a current battery status of the mobile apparatus; or
   a quality of transmissions received from the mobile apparatus.

19. The apparatus according to claim 16, wherein the criterion monitored by the stationary apparatus relates to at least one of:
   time of day;
   a load placed on processing resources of the stationary apparatus;
   utilization of data transmission resources; or
   a number of mobile apparatuses from which positioning packets are received.

20. The apparatus according to claim 16 wherein the re-configuration message indicates at least one of:
   a transmit power for the location tag at the mobile apparatus;
   a range of transmit powers for the location tag at the mobile apparatus;
   a change in a transmit power currently used by the location tag at the mobile apparatus; or
   rules or policies for adjusting the transmit power by the location tag at the mobile apparatus.

21. The apparatus according to claim 18, further comprising a circuit implemented in hardware or at least one processor and at least one memory including computer program code to transmit, by the mobile apparatus, one or more of:
   a confirmation of adjustment of transmit power;
   a report of failure of an adjustment of transmit power;
   an indication of an adjusted transmit power;
   an energy status of a battery of the mobile apparatus;
   supported transmit power levels;
   an indication of a dynamic state of the mobile apparatus; or
   an indication of a mode of operation of the mobile apparatus.

22. A non-transitory computer readable medium having stored thereon computer program code that when executed by a processor causes an apparatus to perform at least the following:
   monitoring at least one criterion for an adjustment of a transmit power of a positioning packet transmitted by a location tag at a mobile apparatus, wherein the positioning packet is for use by a positioning service to calculate a position of the mobile apparatus; and
   when it is detected that the at least one criterion is met, causing an adjustment of the transmit power specifically of positioning packets transmitted by the location tag at the mobile apparatus.

* * * * *